US007403849B1

(12) United States Patent
Watanabe et al.

(10) Patent No.: US 7,403,849 B1
(45) Date of Patent: Jul. 22, 2008

(54) CONTROL APPARATUS FOR AN INTERNAL COMBUSTION ENGINE

(75) Inventors: Shinji Watanabe, Tokyo (JP); Koji Nishimoto, Tokyo (JP); Toru Tanaka, Tokyo (JP); Mitsuyasu Kunihiro, Tokyo (JP); Ryuji Nakamura, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/878,980

(22) Filed: Jul. 30, 2007

(30) Foreign Application Priority Data

Feb. 2, 2007 (JP) ............................ 2007-024237

(51) Int. Cl.
*F02D 13/02* (2006.01)

(52) U.S. Cl. .................................... 701/102; 123/90.17

(58) Field of Classification Search ................. 701/102; 123/90.15, 90.17
See application file for complete search history.

(56) References Cited

U.S. PATENT DOCUMENTS 5,611,304 A * 3/1997 Shinojima ................ 123/90.15

FOREIGN PATENT DOCUMENTS

JP 2001-152886 A 6/2001
JP 2005-291141 A * 10/2005

* cited by examiner

*Primary Examiner*—Hieu T Vo
(74) *Attorney, Agent, or Firm*—Sughrue Mion, PLLC

(57) ABSTRACT

A control apparatus for an internal combustion engine can control an actual operating characteristic with high precision by shortening a response time thereof. The control apparatus capable of changing an actual phase angle of a camshaft by an OCV includes a crank angle sensor for detecting a crank angle of a crankshaft and generating a crank angle signal, an actual phase angle detection section for detecting the actual phase angle of the camshaft, an air flow sensor and a throttle position sensor for detecting an operating state of the engine, a target phase angle calculation section for calculating a target phase angle based on the operating state, and a phase angle feedback control section for calculating an operation amount to the OCV so as to make the actual phase angle coincide with the target phase angle. The phase angle feedback control section calculates the operation amount in synchronization with the crank angle signal.

13 Claims, 12 Drawing Sheets

CONTROL APPARATUS FOR AN INTERNAL COMBUSTION ENGINE

BACKGROUND OF THE INVENTION

1. Field of the Invention

The present invention relates to a control apparatus for changing the operating characteristic of an internal combustion engine in accordance with the operating state thereof, and more particularly, it relates to a control apparatus for an internal combustion engine which servers to control, for example, the opening and closing timing (valve timing) of an intake valve and an exhaust valve by changing the phase angle of a camshaft with respect to that of a crankshaft of the internal combustion engine.

2. Description of the Related Art

Conventionally, there has been known a control apparatus for an internal combustion engine which can change the operating characteristic of the internal combustion engine by means of an actuator.

Hereinafter, reference will be made, as an example, to a case where the operating characteristic of an internal combustion engine is the phase angle of a camshaft with respect to that of a crankshaft of the internal combustion engine.

A known valve timing control apparatus for an internal combustion engine includes an intake valve and an exhaust valve that are driven to operate in synchronization with the rotation of the internal combustion engine so as to open and close an intake passage and an exhaust passage, respectively, leading to a combustion chamber of the internal combustion engine, a valve timing variable mechanism that changes the opening and closing timing of the intake valve or the exhaust valve by changing the phase angle of a camshaft with respect to a crankshaft of the internal combustion engine, an operating state detection section that detects the operating state of the internal combustion engine (hereinafter also referred to as an engine operating state), a target operating characteristic calculation section (target valve timing calculation section) that calculates a target phase angle of the camshaft (target valve timing and target operating characteristic) in accordance with the engine operating state, an actual operating characteristic detection section (actual valve timing detection section) that detects an actual phase angle of the camshaft (actual valve timing and actual engine operating characteristic), and an operation amount feedback control section (actual valve timing control section) that calculates an amount of operation (a quantity of control) for the valve timing variable mechanism according to feedback control (hereinafter also referred to as "F/B control") so as to make the target phase angle and the actual phase angle coincide with each other (see, for example, a first patent document: Japanese patent application laid-open No. 2001-152886).

In this valve timing control apparatus, the actual operating characteristic detection section detects the actual phase angle of the camshaft at every predetermined crank angle. In addition, the operation amount feedback control section calculates the amount of operation for the valve timing variable mechanism based on the detected actual phase angle according to phase angle feedback control at a fixed period (e.g., 25 msec) different from the detection period of the actual phase angle.

Accordingly, the actual phase angle is detected, and the amount of operation for the valve timing variable mechanism is calculated based on the actual phase angle, so that the valve timing variable mechanism is driven to operate based on the amount of operation thus calculated.

As a result, there is a possibility that a control delay time until the start of operation of the valve timing variable mechanism might be lengthened.

Hereinafter, reference will be made to the control delay time due to the above-mentioned known valve timing control apparatus while referring to a timing chart in FIG. 12.

FIG. 12 is the timing chart that shows the control delay time occurring when the operation amount feedback control section executes the phase angle feedback control at a fixed period Tfb in the known valve timing control apparatus.

Here, description will be made to a case where the actual phase angle is detected immediately after the execution of the phase angle feedback control.

In FIG. 12, a control delay time Tcntd is the sum total of an actual phase angle detection delay time Tpdd occurring upon detection of the actual phase angle, a phase angle feedback control processing delay time Tfbd occurring upon execution of the phase angle feedback control, and a PWM driving delay time Tpwmd occurring upon driving the valve timing variable mechanism in a PWM (Pulse Width Modulation) manner.

Here, note that the actual phase angle detection delay time Tpdd is set, as a general delay time, to ½ of a period Tsgt of the crank angle signal for example.

At this time, the actual phase angle is detected immediately after the execution of the phase angle feedback control, so the phase angle feedback control processing delay time Tfbd becomes equal to one fixed period Tfb of the phase angle feedback control.

That is, owing to a deviation between the detection timing of the actual phase angle and the execution timing of the phase angle feedback control, the control delay time Tcntd will contain the phase angle feedback control processing delay time Tfbd corresponding, at maximum, to the one fixed period Tfb of the phase angle feedback control, so the control delay time Tcntd becomes longer.

Accordingly, when the gain of the phase angle feedback control is set to a large value so as to improve the response of the actual phase angle, the actual phase angle causes hunting due to the above-mentioned control delay time Tcntd.

Thus, the gain of the phase angle feedback control can not be set to a large value, so the response time of the actual phase angle is lengthened.

In addition, in this valve timing control apparatus, when the internal combustion engine is rotating at a low speed of about 600 rpm for instance, the detection period of the actual phase angle (e.g., 50 msec when the actual phase angle is detected at every crank angle of 180 degrees) becomes longer than the fixed period (25 msec) of the phase angle feedback control.

Accordingly, the amount of operation for the valve timing variable mechanism is repeatedly calculated based on the same actual phase angle that is different from the actual phase angle until the actual phase angle is detected and updated.

In the known valve timing control apparatus for an internal combustion engine, the gain of the phase angle feedback control can not be set to a large value, so there has been a problem that the response time of the actual phase angle becomes relatively long.

In addition, when the internal combustion engine is rotating at low rotational speed, the amount of operation for the valve timing variable mechanism is repeatedly calculated based on the same actual phase angle that was previously detected and is different from a current actual phase angle until the current or fresh actual phase angle is detected and updated, so there has also been a problem that the control accuracy of the actual phase angle is reduced.

SUMMARY OF THE INVENTION

Accordingly, the present invention is intended to obviate the problems as referred to above, and has for its object to provide a control apparatus for an internal combustion engine which is capable of shortening a control delay time thereby to decrease the response time of an actual engine operating characteristic, and of controlling the actual engine operating characteristic with a high degree of precision.

Bearing the above object in mind, according to the present invention, there is provided a control apparatus for an internal combustion engine which is capable of changing an operating characteristic of the internal combustion engine by means of an actuator. The control apparatus includes: a crank angle sensor that detects a crank angle of a crankshaft of the internal combustion engine and generates a crank angle signal; an actual operating characteristic detection section that detects an actual value of the operating characteristic as an actual engine operating characteristic; an operating condition detection section that detects an operating state of the internal combustion engine; a target operating characteristic calculation section that calculates a target value of the operating characteristic as a target operating characteristic based on the engine operating state; and an operation amount feedback control section that calculates an amount of operation with respect to the actuator according to feedback control so as to make the actual operating characteristic and the target operating characteristic coincide with each other. The operation amount feedback control section calculates the amount of operation in synchronization with the crank angle signal.

According to the control apparatus for an internal combustion of the present invention, since the operation amount feedback control section calculates the amount of operation for the actuator in synchronization with the crank angle signal, there is no deviation between the detection timing of the actual engine operating characteristic and the execution timing of the phase angle feedback control, and the control delay time is shortened, so the gain of the phase angle feedback control can be set to a large value, thereby making it possible to shorten the response time of the actual phase angle.

In addition, the amount of operation for the actuator is always calculated based on the latest actual engine operating characteristic, so it is possible to control the actual engine operating characteristic with high accuracy.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Figure 1:
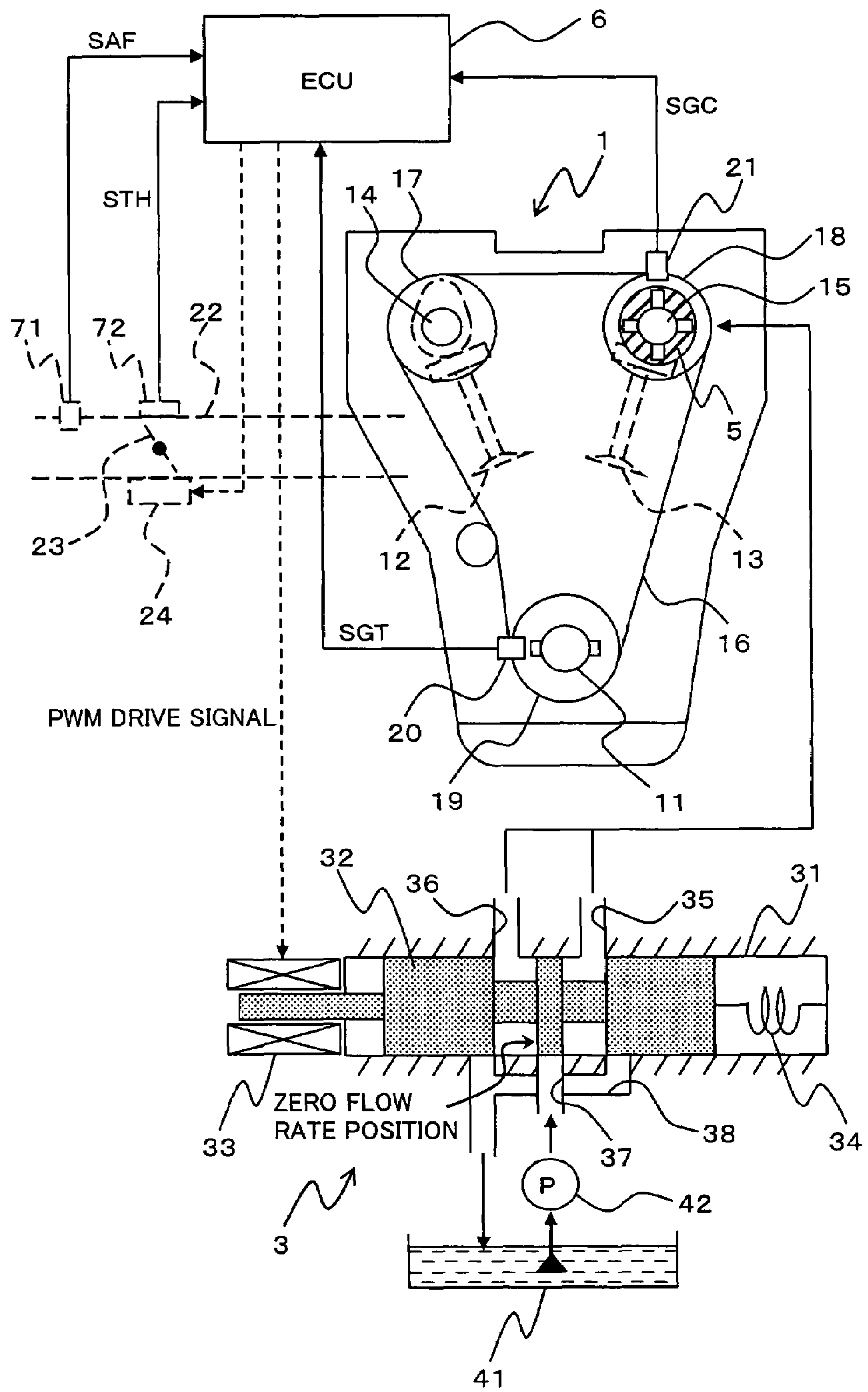
FIG. 1 is a construction view showing an entire system including a control apparatus for an internal combustion engine according to a first embodiment of the present invention.

Now, preferred embodiments of the present invention will be described in detail while referring to the accompanying drawings. Throughout respective figures, the same or corresponding members or parts are identified by the same reference numerals and characters.

Embodiment 1

Referring to the drawings and first to FIG. 1, therein is shown an entire system including a control apparatus for an internal combustion engine according to a first embodiment of the present invention.

In FIG. 1, an internal combustion engine 1 has a combustion chamber (not shown) defined by a tubular cylinder (not shown) and a piston that is connected with a crankshaft 11, wherein a mixture having fuel and air mixed with each other is sucked into the combustion chamber so as to be combusted therein.

The cylinder is provided with an intake valve 12 for opening and closing an intake passage 22 leading to the combustion chamber, and an exhaust valve 13 for opening and closing an exhaust passage (not shown) leading to the combustion chamber.

At an upstream side of the intake passage 22, there is arranged an air flow sensor 71 (i.e., an operating condition detection section and an actual operating characteristic detection section) that serves to detect an actual amount of intake air sucked into the internal combustion engine 1 (i.e., an engine operating state and an actual engine operating characteristic) and to output an air amount signal SAF.

In addition, at an internal combustion engine 1 side downstream of the air flow sensor 71 in the intake passage 22, there are arranged a throttle valve 23 that is electronically controlled to open and close so as to adjust the amount of intake air, and a throttle actuator 24 (also referred to as an actuator) that drives the throttle valve 23. The throttle valve 23 has a throttle position sensor 72 (an operating condition detection section) installed thereon for detecting the degree of opening (hereinafter referred to as a throttle opening) of the throttle valve 23 (engine operating state) and outputting a corresponding throttle opening signal STH.

A camshaft 14 and a camshaft 15 for driving the intake valve 12 and the exhaust valve 13 to open and close, respectively, are provided with a timing pulley 17 and a timing pulley 18, respectively, around which a timing belt 16 is wrapped for transmitting the rotation of the crankshaft 11 to these camshafts 12, 13.

Also, the crankshaft 11 is provided with a crankshaft pulley 19 around which the timing belt 16 is wrapped.

During the operation of the internal combustion engine 1, the rotation of the crankshaft 11 is transmitted to the camshafts 14, 15 through the crankshaft pulley 19, the timing belt 16 and the timing pulleys 17, 18.

As a result, the intake valve 12 and the exhaust valve 13 are driven to open and close in synchronization with the rotation of the crankshaft 11 and the vertical motion of the piston.

That is, the intake valve 12 and the exhaust valve 13 are driven to operate at predetermined opening and closing timing in synchronization with a series of four strokes comprising an intake stroke, a compression stroke, an explosion (expansion) stroke and an exhaust stroke in the internal combustion engine 1.

Further, the crank angle sensor 20 for detecting the crank angle or rotational position of the crankshaft is mounted on the crankshaft 11. The crank angle sensor 20 detects the crank angle from protrusions formed on the crankshaft 11, and outputs a pulse-shaped crank angle signal SGT.

Similarly, a cam angle sensor 21 for detecting the cam angle or rotational position of the camshaft 15 is mounted on the camshaft 15. The cam angle sensor 21 detects the cam angle from protrusions formed on the camshaft 15, and outputs a pulse-shaped cam angle signal SGC.

Here, note that the crank angle sensor 20 and the cam angle sensor 21 are constructed in such a manner that when the crank angle sensor 20 generates N pulses in accordance with one revolution of the crankshaft 11, the cam angle sensor 21 is set to generate 2N pulses in accordance with one revolution of the camshaft 15.

In addition, when a timing conversion angle maximum value of the camshaft 15 is represented by VTmax degrees CA (crank angle), the number of pulses N is set as follows: $N \leqq (360/VTmax)$.

With the above settings, an actual phase angle VTa of the camshaft 15 (actual engine operating characteristic) can be detected by using the pulse of the crank angle signal SGT and the pulse of the next cam angle signal SGC following this crank angle signal pulse.

Further, the camshaft 15 is provided with a valve timing control mechanism 5 (a hatched portion in FIG. 1) which is driven to change the opening and closing timing of the exhaust valve 13 under the action of operating fluid or hydraulic oil from an oil control valve 3 (hereinafter abbreviated as an "OCV 3") (actuator) to be described later.

The valve timing control mechanism 5 continuously changes the opening and closing timing of the exhaust valve 13 by changing the phase angle of the camshaft 15 with respect to the timing pulley 18 (i.e., the phase angle of the camshaft 15 with respect to the crankshaft 11) (operating characteristic) in accordance with the amount of the hydraulic operating oil.

The valve timing control mechanism 5 has a retard angle hydraulic chamber (not shown) to which the hydraulic operating oil is supplied to move the camshaft 15 to a retard angle side, and an advance angle hydraulic chamber (not shown) to which the hydraulic operating oil is supplied to move the camshaft 15 to an advance angle side.

Here, note that the valve timing control mechanism 5 may be provided on the camshaft 14 so as to change the opening and closing timing of the intake valve 12.

The OCV 3 for controlling the amount of the hydraulic operating oil supplied to the valve timing control mechanism 5 includes a spool 32 that is slidable in a housing 31, a linear solenoid 33 that drives the spool 32 in the PWM manner in accordance with a PWM drive signal from the ECU 6 (to be described later), and a spring 34 that urges the spool 32 to a direction opposite to the driving direction of the linear solenoid 33.

The housing 31 of the OCV 3 is formed with a retard angle side oil supply passage 35 that is in fluid communication with the retard angle hydraulic chamber, an advance angle side oil supply passage 36 that is in fluid communication with the advance angle hydraulic chamber, an oil supply passage 37 that is placed in fluid communication with either the retard angle side oil supply passage 35 or the advance angle side oil supply passage 36 by driving the spool 32, and an oil discharge passage 38 that is in fluid communication with a lubricating oil tank 41 in which the hydraulic operating oil is received.

The oil supply passage 37 pressure feeds the hydraulic operating oil, which is sucked up from the lubricating oil tank 41 by means of a pump 42, to the retard angle side oil supply passage 35 or the advance angle side oil supply passage 36.

Also, the hydraulic operating oil from the retard angle hydraulic chamber or the advance angle hydraulic chamber is returned to the lubricating oil tank 41 through the oil discharge passage 38.

Here, the amounts of the hydraulic operating oil supplied to the retard angle side oil supply passage 35 and the advance angle side oil supply passage 36 are increased and decreased by the continuous change in the degrees of opening of the retard angle side oil supply passage 35 and the advance angle side oil supply passage 36 under the driving action of the spool 32.

At this time, the degrees of opening of the retard angle side oil supply passage 35 and the advance angle side oil supply passage 36 are decided in accordance with the current value of the PWM drive signal input to the linear solenoid 33.

Figure 2:
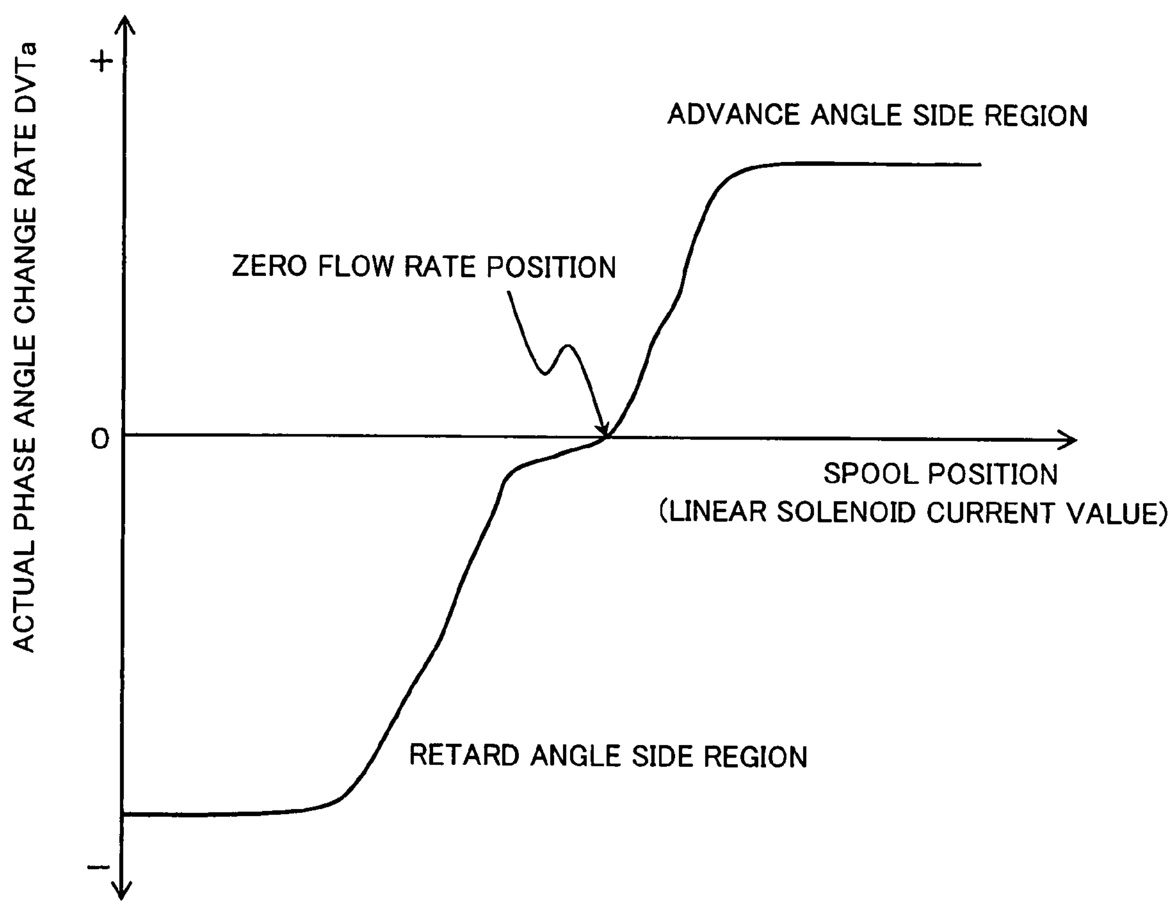
FIG. 2 is an explanatory view showing the relation between the position of a spool in an OCV in FIG. 1 and the change rate of an actual phase angle.

FIG. 2 is an explanatory view that shows the relation between the position of the spool 32 (hereinafter referred to as a "spool position") in the OCV 3 of FIG. 1 and an actual phase angle change rate DVTa (the change rate of the actual engine operating characteristic).

In FIG. 2, the spool position is in a proportional relation to the value of current supplied to the linear solenoid 33. A region in which the actual phase angle change rate DVTa is positive corresponds to a region in which the valve timing is moved in an advance angle direction, whereas a region in which the actual phase angle change rate DVTa is negative corresponds to a region in which the valve timing is moved in a retard angle direction.

Also, in case where the actual phase angle VTa does not change (i.e., the actual phase angle change rate DVTa=0) in FIG. 2, the oil supply passage 37 is not placed in communication with any of the retard angle side oil supply passage 35 and the advance angle side oil supply passage 36 in FIG. 1. The spool position at this time is set as a zero flow rate position (i.e., a position in which the amount of the hydraulic operating oil supplied from the OCV 3 becomes zero).

Here, note that a variation in the relation between the zero flow rate position and the current value of the linear solenoid 33 is caused by the individual difference of the OCV 3, or the endurance degradation of the OCV 3, or an operating environment (e.g., the temperature of the hydraulic operating oil or the number of revolutions per minute of the internal combustion engine 1).

Accordingly, in the known control apparatus shown in the above-mentioned first patent document for example, in case where the actual phase angle VTa calculated by the ECU 6 converges into a target phase angle VTt, and where a state in which the spool position is held at the zero flow rate position continues for a predetermined period of time, the current value of the linear solenoid 33 at this time is learned as a holding current.

In addition, in the phase angle feedback control performed by a phase angle feedback control section (to be described later), the robustness of phase angle control is ensured by executing current feedback control based on this holding current.

Here, the air amount signal SAF from the air flow sensor 71, the throttle opening signal STH from the throttle position sensor 72, the crank angle signal SGT from the crank angle sensor 20, and the cam angle signal SGC from the cam angle sensor 21 are respectively input to the ECU 6.

The ECU 6 calculates, based on measurement signals from the above-mentioned individual sensors, an amount of operation Dout (duty drive signal) to the OCV 3 according to the phase angle feedback control so as to make the actual phase angle VTa and the target phase angle VTt (target operating characteristic) of the camshaft 15 coincide with each other, and outputs the PWM drive signal to the OCV 3.

Figure 3:
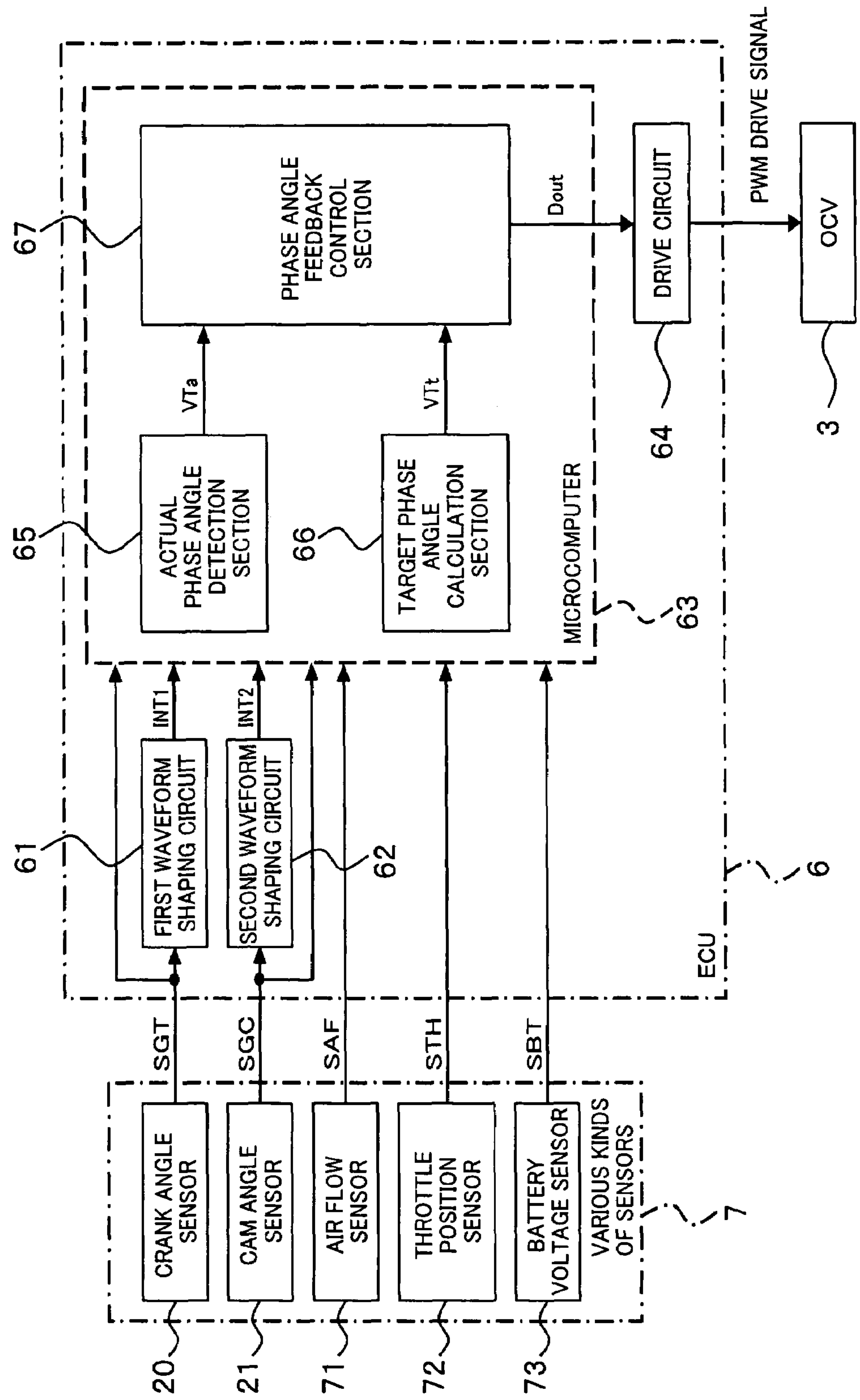
FIG. 3 is a functional block diagram specifically illustrating an ECU in FIG. 1.

FIG. 3 is a functional block diagram specifically illustrating the ECU 6 in FIG. 1.

In FIG. 3, various kinds of sensors 7 and the OCV 3 are connected to the ECU 6.

The various kinds of sensors 7 includes the crank angle sensor 20, the cam angle sensor 21, the air flow sensor 71 and the throttle position sensor 72, as already referred to above, and in addition thereto, further includes a battery voltage sensor 73 that detects a voltage value VB of a battery (not shown) (hereinafter referred to as a "battery voltage VB") and outputs a corresponding battery voltage signal SBT.

Also, the ECU 6 is provided with a first waveform shaping circuit 61, a second waveform shaping circuit 62, a microcomputer 63, and a drive circuit 64.

The first waveform shaping circuit 61 waveform shapes the crank angle signal SGT from the crank angle sensor 20, and outputs it to the microcomputer 63 as a first interrupt command signal INT1.

The second waveform shaping circuit 62 waveform shapes the cam angle signal SGC from the cam angle sensor 21, and outputs it to the microcomputer 63 as a second interrupt command signal INT2.

The microcomputer 63 calculates the amount of operation Dout for the linear solenoid 33 of the OCV 3 based on measurement signals from the various kinds of sensors 7, and outputs a PWM drive signal corresponding to the amount of operation Dout thus obtained to the drive circuit 64.

The drive circuit 64 controls the current value of the linear solenoid 33 based on the PWM drive signal from the microcomputer 63.

In addition, the microcomputer 63 has an actual phase angle detection section 65 (an actual operating characteristic detection section), a target phase angle calculation section 66 (a target operating characteristic calculation section), and a phase angle feedback control section 67 (an operation amount feedback control section).

The actual phase angle detection section 65 detects, based on the crank angle signal SGT and the cam angle signal SGC, the relative phase angle of the camshaft 15 with respect to the crankshaft 11 as an actual phase angle VTa.

The target phase angle calculation section 66 calculates the target phase angle VTt of the camshaft 15 based on engine operating states in the form of the air amount signal SAF, the throttle opening signal STH and the number of revolutions per minute NE of the internal combustion engine 1 (to be described later).

The phase angle feedback control section 67 calculates the amount of operation Dout with respect to the linear solenoid 33 of the OCV 3 according to the phase angle feedback control due to PID (Proportional, Integral and Differential) control so as to make the actual phase angle VTa and the target phase angle VTt coincide with each other.

Here, the phase angle feedback control section 67 calculates the amount of operation Dout with respect to the linear solenoid 33 in synchronization with the crank angle signal SGT.

In this regard, it is to be noted that the microcomputer 63 comprises a CPU (a central processing unit, not shown) that performs various operational calculations and determinations, a ROM (not shown) in which predetermined control programs and the like are stored beforehand, a RAM (not shown) that temporarily stores the calculation results of the CPU, etc., an A/D converter (not shown) that converts an analog signal into a digital value, a counter (not shown) that measures the period of an input signal, etc., a timer (not shown) that measures the drive time of an output signal, etc., an output port (not shown) in the form of an output interface, and a common bus (not shown) that connects the abovementioned individual blocks or elements to one another.

Subsequently, reference will be made to the operation of the microcomputer 63 when the second interrupt command signal INT2 is input from the second waveform shaping circuit 62 in the microcomputer 63 according to the first embodiment of the present invention while referring to a flow chart in FIG. 4 together with FIG. 1 through FIG. 3.

Figure 4:
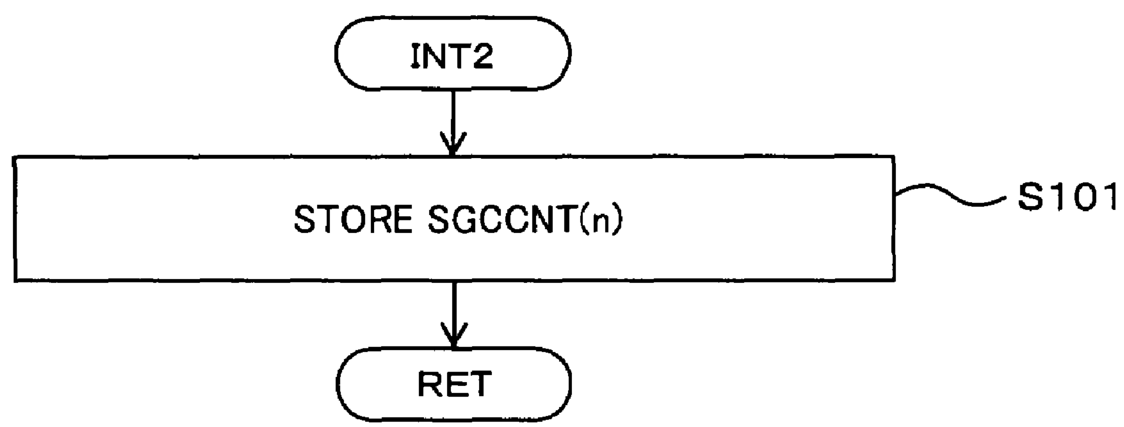
FIG. 4 is a flow chart explaining the operation of the system when a second interrupt command signal is input from a second waveform shaping circuit in a microcomputer according to the first embodiment of the present invention.

Each time an interrupt is made by the second interrupt command signal INT2 from the second waveform shaping circuit 62, the microcomputer 63 reads a counter value SGCNT of the counter, and stores it in the RAM as a counter value SGCCNT(n) upon input of a cam angle signal (step S101), after which the processing of FIG. 4 is terminated.

Here, note that n is set to a value that represents an arbitrary stroke number.

Subsequently, reference will be made to the operation of the microcomputer 63 when the first interrupt command signal INT1 is input from the first waveform shaping circuit 61 in the microcomputer 63 according to the first embodiment of the present invention while referring to a flow chart in FIG. 5 together with FIG. 1 through FIG. 4.

First of all, the microcomputer 63 stores a counter value SGTCNT (n−1) upon input of the last (stroke n−1) crank angle signal and a counter value SGTCNT(n) upon input of the current (stroke n) crank angle signal in the RAM (step S201).

Specifically, each time an interrupt is made by the first interrupt command signal INT1 from the first waveform shaping circuit 61, the microcomputer 63 reads the counter value SGTCNT(n) that was stored in the RAM upon input of the last crank angle signal SGT, and stores it in the RAM as a last counter value SGTCNT(n−1) upon input of the last crank angle signal.

Also, each time an interrupt is made by the first interrupt command signal INT1 from the first waveform shaping circuit 61, the microcomputer 63 reads the counter value SGCNT of the counter, and stores it in the RAM as a current counter value SGTCNT(n) upon input of the current crank angle signal.

Subsequently, the microcomputer 63 calculates a period Tsgt (=SGTCNT(n)−SGTCNT(n−1)) of the crank angle signal SGT from a difference between the last counter value SGTCNT (n−1) upon input of the last crank angle signal and the current counter value SGTCNT(n) upon input of the current crank angle signal, and calculates the number of revolutions per minute NE of the internal combustion engine 1 based on the period Tsgt of the crank angle signal SGT (hereinafter abbreviated as a "crank angle signal period Tsgt") (step S202).

Then, the actual phase angle detection section 65 detects the actual phase angle VTa of the camshaft 15 based on the current counter value SGTCNT(n) upon input of the current crank angle signal and the counter value SGCCNT(n) upon input of the cam angle signal (step S203).

Hereinafter, detailed reference will be made to the operation of the actual phase angle detection section 65 for detecting the actual phase angle VTa while referring to a timing chart in FIG. 6.

Figure 6:
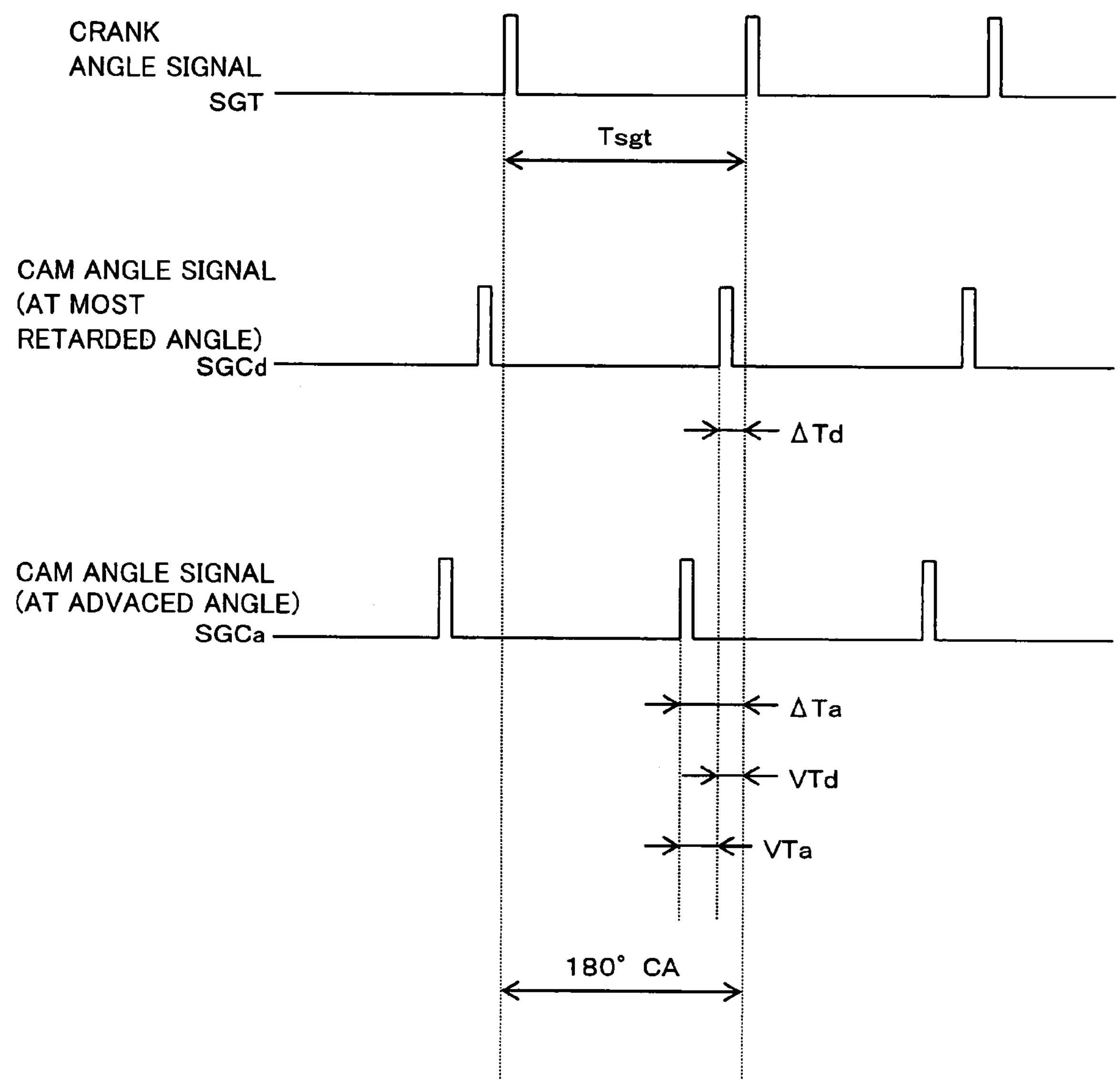
FIG. 6 is a timing chart showing a crank angle signal, a cam angle signal at the time of the most retarded angle and a cam angle signal at the time of an advanced angle according to the first embodiment of the present invention.

FIG. 6 is the timing chart that shows the crank angle signal SGT, a cam angle signal SGCd at the time of the most retarded angle (hereinafter referred to as a most retarded angle cam angle signal SGCd), and a cam angle signal SGCa at the time of an advanced angle (hereinafter referred to as an advanced angle cam angle signal SGCa) according to the first embodiment of the present invention, wherein there are shown a phase relation between the crank angle signal SGT and the cam angle signals SGCd, SGCa, and a processing method for calculating the actual phase angle VTa.

In FIG. 6, first of all, the actual phase angle detection section 65 reads from the RAM the current counter value SGTCNT(n) upon input of the current crank angle signal and the counter value SGCaCNT(n) upon input of the cam angle signal when the advanced angle cam angle signal SGCa is input, and calculates an advanced angle phase difference time ΔTa (=SGTCNT(n)−SGCaCNT(n)) from the advanced angle cam angle signal SGCa to the crank angle signal SGT.

Also, the actual phase angle detection section 65 reads from the RAM the counter value SGCdCNT(n) upon input of the cam angle signal when the most retarded cam angle signal SGCd is input, and calculates a most retarded angle phase difference time ΔTd (=SGTCNT(n)−SGCdCNT(n)) from the most retarded angle cam angle signal SGCd to the crank angle signal SGT.

Subsequently, the actual phase angle detection section 65 calculates a most retarded angle valve timing VTd from the following expression (1) based on the most retarded angle phase difference time ΔTd, the crank angle signal period Tsgt calculated in the above step S202, and a reference crank angle (180 degrees CA) of the crank angle signal SGT in the four-cylinder internal combustion engine 1, and stores it in the RAM.

$$VTd=(\Delta Td/Tsgt)\times 180 \text{ [degrees CA]} \quad (1)$$

Thereafter, the actual phase angle detection section 65 calculates the actual phase angle VTa from the following expression (2) based on the advanced angle phase difference time Δ Ta, the crank angle signal period Tsgt, the reference crank angle (180 degrees CA), and the most retarded angle valve timing VTd.

$$VTa=(\Delta Ta/Tsgt)\times 180 \text{ [degrees CA]}-VTd \quad (2)$$

Figure 5:
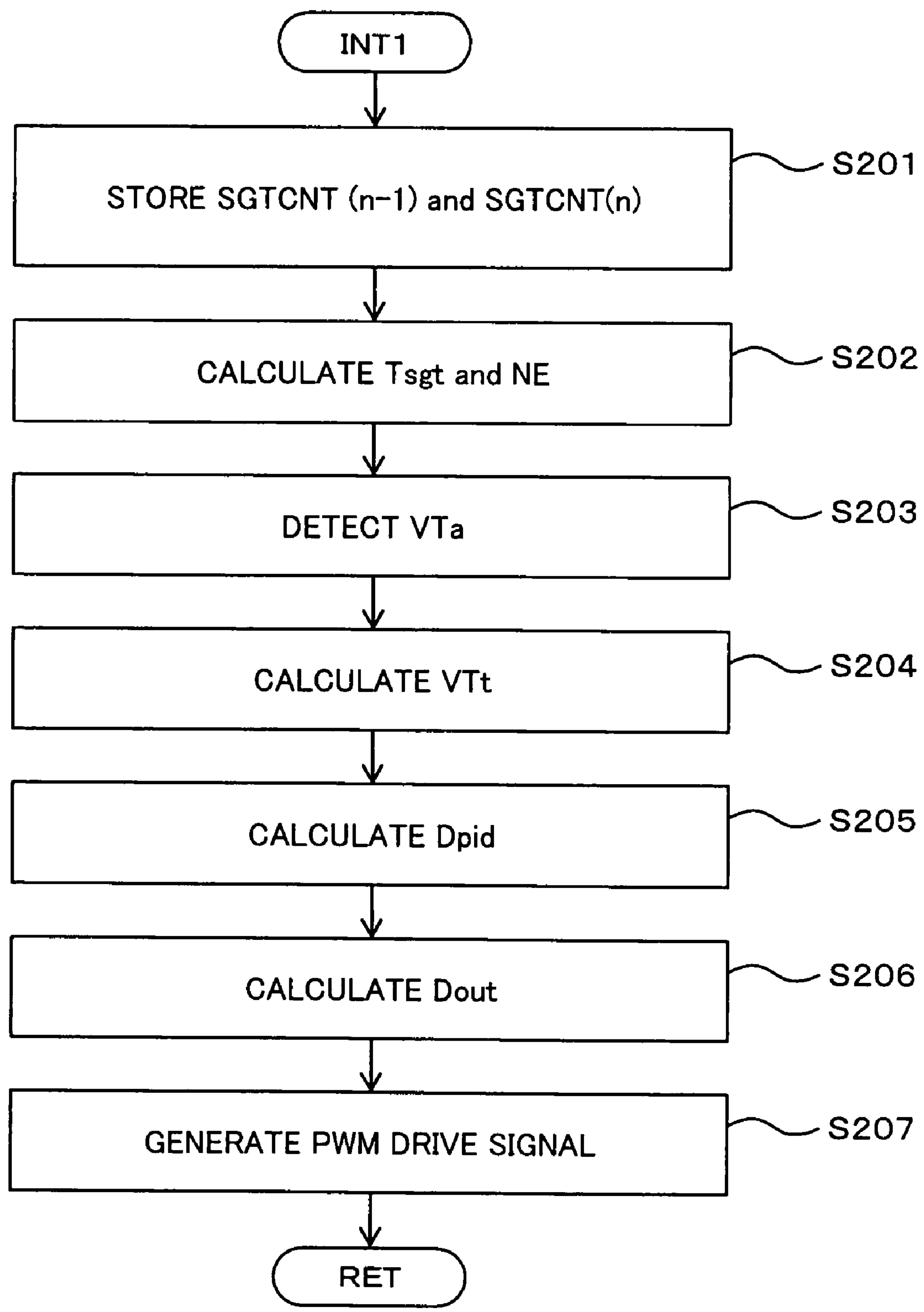
FIG. 5 is a flow chart explaining the operation of the system when a first interrupt command signal is input from a first waveform shaping circuit in the microcomputer according to the first embodiment of the present invention.

Returning to the flow chart in FIG. 5, the target phase angle calculation section 66 calculates the target phase angle VTt of the camshaft 15 based on the air amount signal SAF, the throttle opening signal STH and the number of revolutions per minute NE of the internal combustion engine 1 (step S204).

Specifically, the microcomputer 63 takes in the air amount signal SAF, the throttle opening signal STH, and the battery voltage signal SBT at an input interface (not shown), and outputs them to the A/D converter after having applied thereto processing such as removal of noise components, amplification, etc., wherein individual signals are converted into corresponding digital signals.

The target phase angle calculation section 66 calculates the target phase angle VTt of the camshaft 15 based on the air amount signal SAF, the throttle opening signal STH and the number of revolutions per minute NE of the internal combustion engine 1 thus converted into the digital signals.

Subsequently, the phase angle feedback control section 67 calculates a control correction amount Dpid according to the phase angle feedback control due to the PID control so as to make the actual phase angle VTa detected by the actual phase angle detection section 65 and the target phase angle VTt calculated by the target phase angle calculation section 66 coincide with each other (step S205).

In addition, the phase angle feedback control section 67 calculates the amount of operation Dout with respect to the linear solenoid 33 of the OCV 3 by correcting the control correction amount Dpid while using a battery voltage correction factor KVB (=predetermined reference voltage/VB) that is represented as the ratio of a predetermined reference voltage to the battery voltage VB (step S206).

Then, the microcomputer 63 takes the amount of operation Dout with respect to the linear solenoid 33 into a PWM timer (not shown), and converts it into a PWM drive signal which is to be output at each predetermined PWM drive period which is set beforehand (step S207). Thereafter, the processing of FIG. 5 is terminated.

Hereinafter, detailed reference will be made to the calculation operation of the phase angle feedback control section 67 for calculating the amount of operation Dout while referring to FIG. 7.

Figure 7:
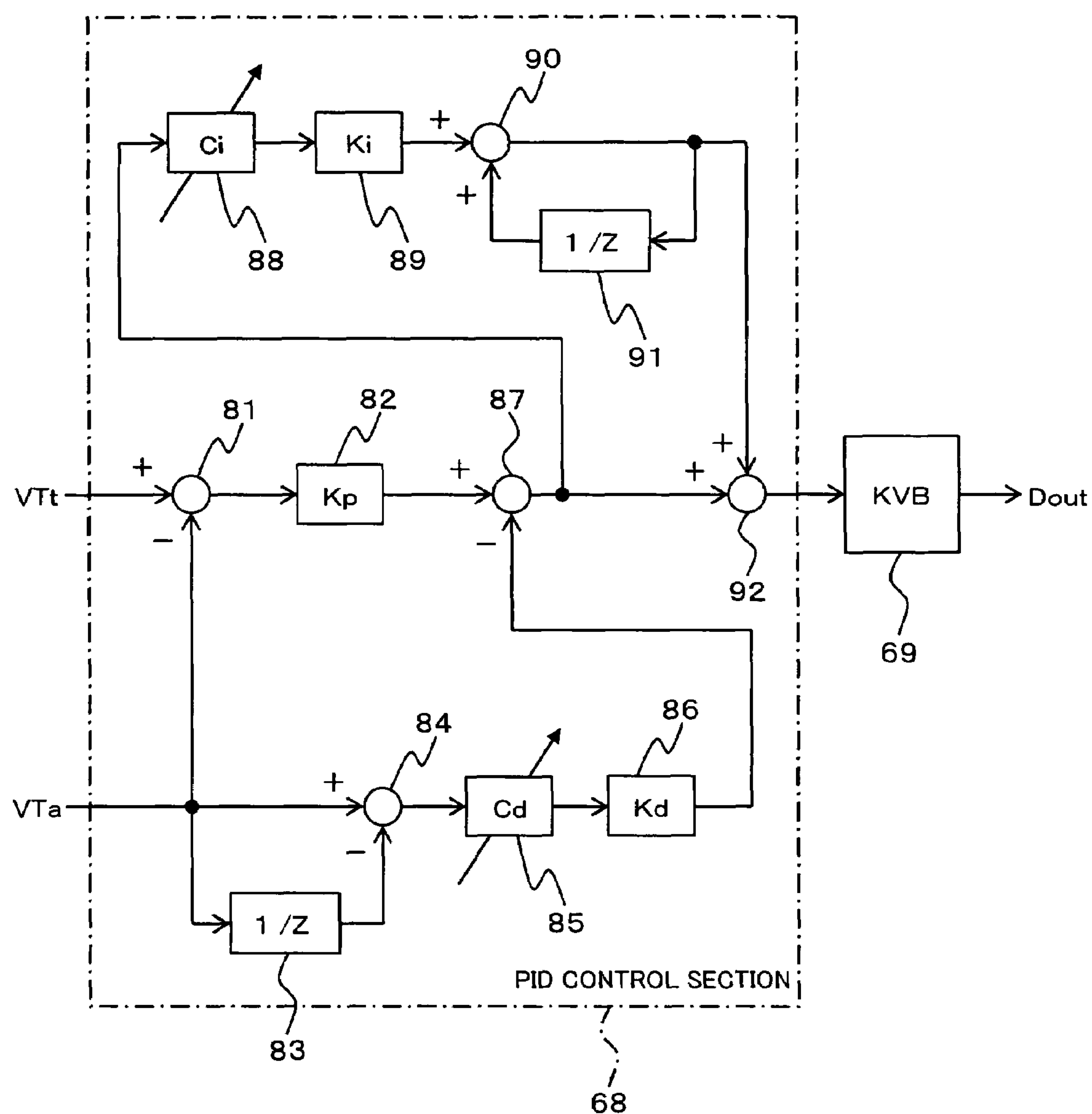
FIG. 7 is a block diagram specifically showing a phase angle feedback control section in the control apparatus for an internal combustion engine according to the first embodiment of the present invention.

FIG. 7 is a block diagram that specifically shows the phase angle feedback control section 67 in the control apparatus for an internal combustion engine according to the first embodiment of the present invention.

Here, an explanation will be made to a case where the amount of operation Dout is calculated according to the PID control of differentiation preceding type in synchronization with the input of the crank angle signal SGT.

In FIG. 7, the phase angle feedback control section 67 includes a PID control section 68 that calculates the control correction amount Dpid according to the phase angle feedback control due to the PID control based on the actual phase angle VTa and the target phase angle VTt, and a correction factor multiplication section 69 that calculates the amount of operation Dout by correcting the control correction amount Dpid by the battery voltage correction factor KVB.

The PID control section 68 has subtracters 81, 84, 87, gain multipliers 82, 86, 89, last value hold circuits 83, 91, coefficient multipliers 85, 88, and adders 90, 92.

Here, each of the last value hold circuits 83, 91 holds an input value, and outputs the thus held value in the next stroke as a one-stroke delayed value.

The subtracter 81 calculates a phase angle deviation EP(n) represented by the following expression (3) by subtracting the actual phase angle VTa(n) from the target phase angle VTt(n) so as to make the actual phase angle VTa(n) detected by the actual phase angle detection section 65 in an arbitrary stroke n follow the target phase angle VTt(n) calculated by the target phase angle calculation section 66.

$$EP(n)=VTt(n)-VTa(n) \quad (3)$$

Subsequently, the gain multiplier 82 calculates a proportional term calculation value XP(n) represented by the following expression (4) by multiplying the phase angle deviation EP(n) by a proportional gain Kp.

$$XP(n)=Kp\times EP(n) \quad (4)$$

Then, the subtracter 84 calculates an actual phase angle change rate DVTa(n) represented by the following expression (5) by subtracting an actual phase angle VTa(n−1) detected in accordance with the last (stroke n−1) crank angle signal SGT (i.e., being held in the last value hold circuit 83) from the actual phase angle VTa(n) detected by the actual phase angle detection section 65 in accordance with the current (stroke n) crank angle signal SGT.

$$DVTa(n)=VTa(n)-VTa(n-1) \quad (5)$$

Subsequently, the coefficient multiplier 85 and the gain multiplier 86 calculate a differential term calculation value XD(n) represented by the following expression (6) by multiplying the actual phase angle change rate DVTa(n) by a second normalization coefficient Cd (to be described later) and a differential gain Kd.

$$XD(n)=DVTa(n)\times Cd\times Kd \quad (6)$$

Then, the subtracter 87 calculates a subtraction value Sub (n) (=XP(n)−XD(n)) by subtracting the differential term calculation value XD(n) from the proportional term calculation value XP(n).

Also, the coefficient multiplier 88 and the gain multiplier 89 calculate an integral sum value IAV(n) represented by the following expression (7) by multiplying the subtraction value Sub(n) by a first normalization coefficient Ci (to be described later) and an integration gain Ki.

$$IAV(n)=Sub(n)\times Ci\times Ki=\{XP(n)-XD(n)\}\times Ci\times Ki \quad (7)$$

Subsequently, the adder 90 calculates an integral term calculation value XI(n) represented by the following expression (8) by adding the integral sum value IAV(n) and the last (stroke n−1) integral term calculation value XI(n−1) held in the last value hold circuit 91.

$$XI(n)=IAV(n)+XI(n-1)=\{XP(n)-XD(n)\}\times Ci\times Ki+XI(n-1) \quad (8)$$

Then, the adder 92 calculates a control correction amount Dpid(n) represented by the following expression (9) by adding the subtraction value Sub(n) and the integral term calculation value XI(n).

$$Dpid(n)=Sub(n)+XI(n)=XP(n)+XI(n)-XD(n) \quad (9)$$

Here, note that the first normalization coefficient Ci multiplied by the coefficient multiplier 88 is set, as shown in the following expression (10), based on the above-mentioned crank angle signal period Tsgt and a predetermined reference period Tbase (e.g., 15 msec).

$$Ci=Tsgt/Tbase \quad (10)$$

In addition, the second normalization coefficient Cd multiplied by the coefficient multiplier 85 is set, as shown in the following expression (11), based on the crank angle signal period Tsgt and a predetermined reference period Tbase (e.g., 15 msec).

$$Cd=Tbase/Tsgt \quad (11)$$

Figure 8:
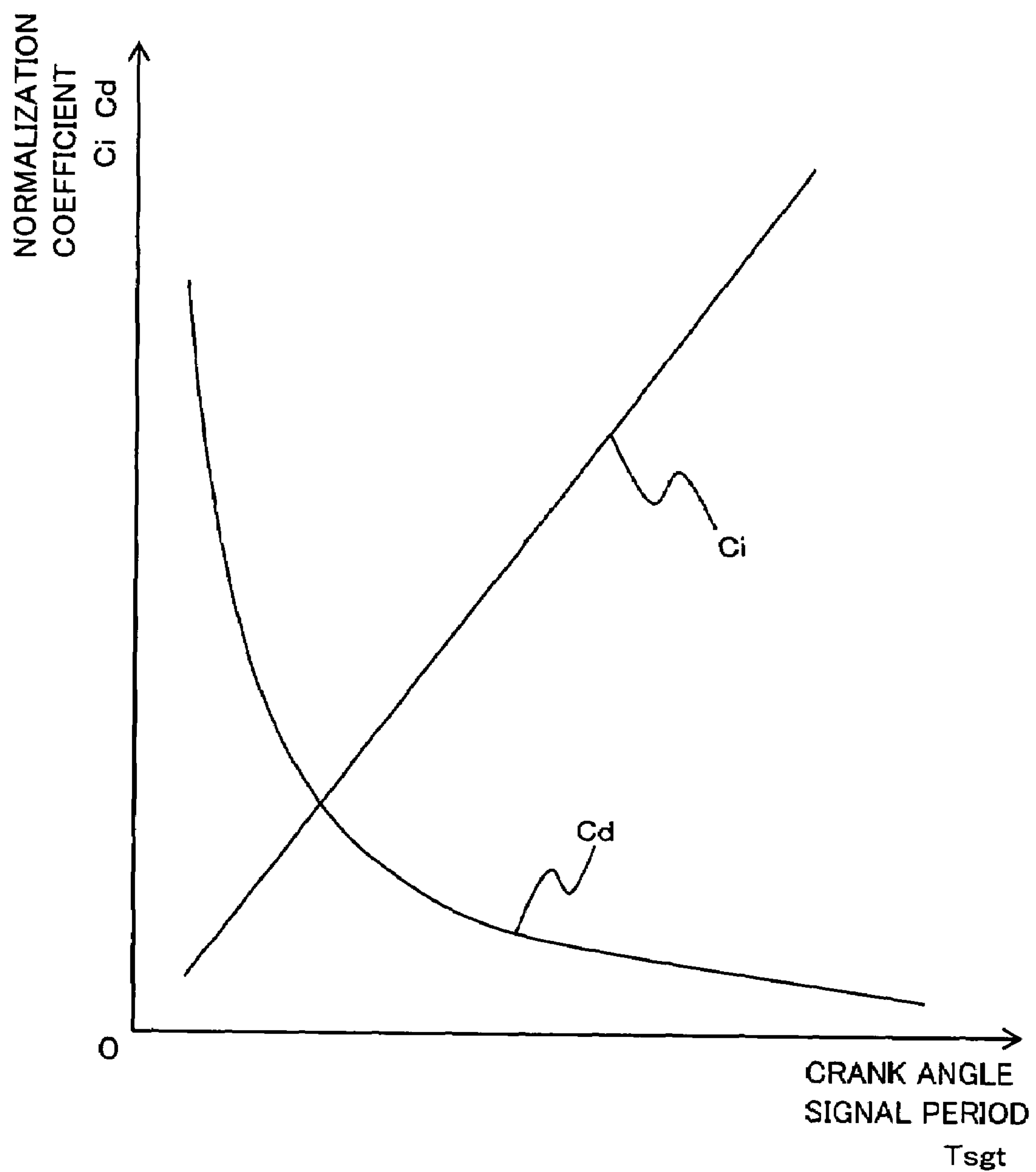
FIG. 8 is an explanatory view showing the relation among a crank angle signal period, a first normalization coefficient and a second normalization coefficient according to the first embodiment of the present invention.

Here, the relation among the crank angle signal period Tsgt, the first normalization coefficient Ci, and the second normalization coefficient Cd is shown in FIG. 8.

In FIG. 8, the first normalization coefficient Ci changes in proportion to the crank angle signal period Tsgt.

Accordingly, even when the control period of the phase angle feedback control section 67 is changed by a change in the crank angle signal period Tsgt in a condition where the phase angle deviation EP is held at the same value, it is possible to set the integral term calculation value XI to the same value by using the first normalization coefficient Ci. That is, it is possible to prevent the excess or deficiency of the integral term calculation value XI due to the change in the crank angle signal period Tsgt.

Accordingly, it is possible to ensure a good control response of the actual phase angle VTa by making the phase angle feedback control of the phase angle feedback control section 67 in synchronization with the crank angle signal SGT thereby to suppress an amount of overshoot and an amount of undershoot of the actual phase angle VTa.

In FIG. 8, the second normalization coefficient Cd changes in inverse proportion to the crank angle signal period Tsgt.

Accordingly, even when the control period of the phase angle feedback control section 67 is changed by the change in the crank angle signal period Tsgt to change the calculation value of the actual phase angle change rate DVTa in a condition where the actual phase angle change rate is held at the same value, it is possible to set the differential term calculation value XD to the same value by using the second normalization coefficient Cd. That is, it is possible to prevent the excess or deficiency of the differential term calculation value XD due to the change in the crank angle signal period Tsgt.

Accordingly, it is possible to ensure a good control response of the actual phase angle VTa by making the phase angle feedback control of the phase angle feedback control section 67 in synchronization with the crank angle signal SGT thereby to suppress an amount of overshoot and an amount of undershoot of the actual phase angle VTa.

Subsequently, the correction factor multiplication section 69 calculates an amount of operation Dout(n) represented by the following expression (12) by correcting the control correction amount Dpid(n) with the battery voltage correction factor KVB (=predetermined reference voltage/VB).

As a result, it is possible to reduce an influence due to the variation of the battery voltage VB.

$$Dout(n)=Dpid(n)\times KVB \quad (12)$$

Hereinafter, detailed reference will be made to the calculation operation of the phase angle feedback control section 67 for calculating the amount of operation Dout while referring to a timing chart in FIG. 9.

Figure 9:
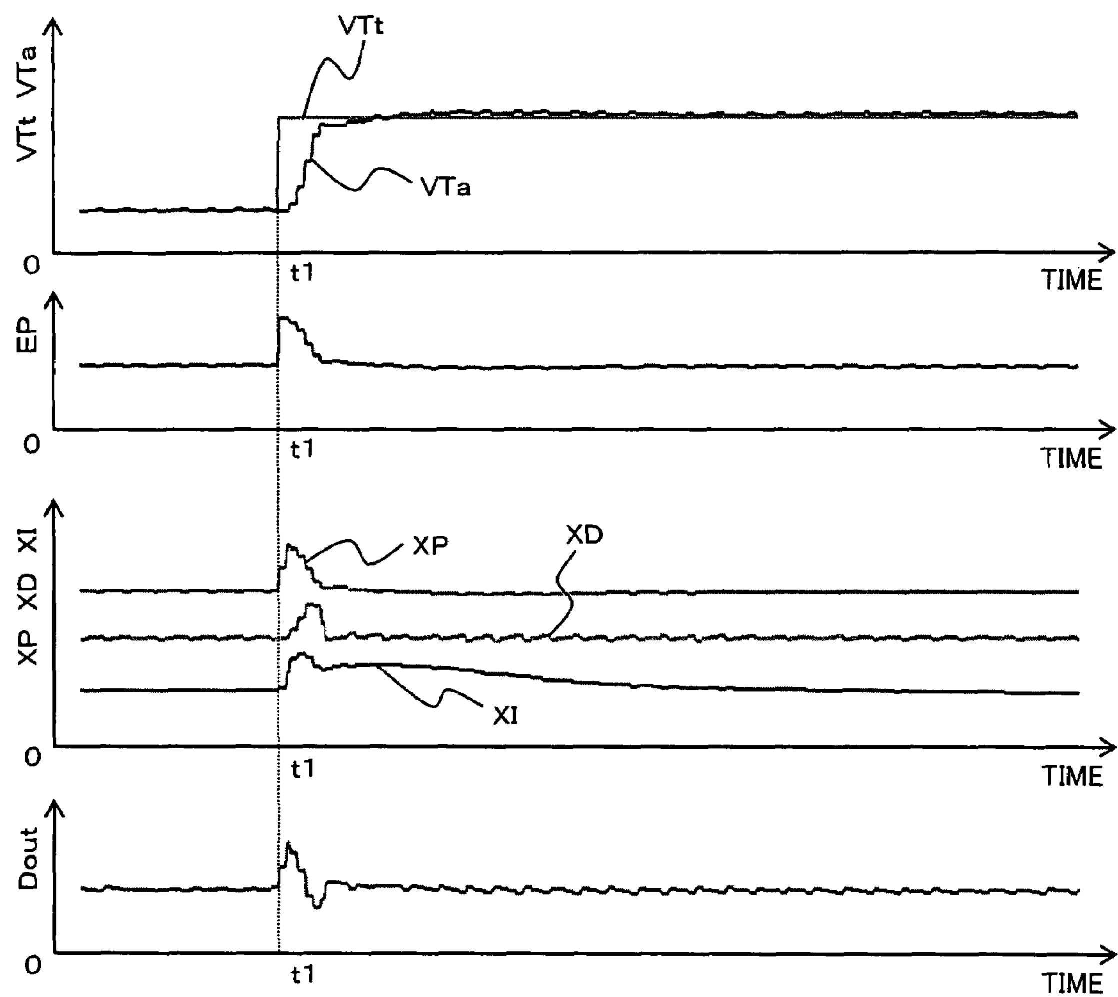
FIG. 9 is a timing chart showing the changes of a target phase angle, an actual phase angle, a phase angle deviation, a proportional term calculation value, a differential term calculation value, an integral term calculation value, and an amount of operation according to the first embodiment of the present invention.

FIG. 9 is the timing chart that shows the changes of the target phase angle VTt, the actual phase angle VTa, the phase angle deviation EP, the proportional term calculation value XP, the differential term calculation value XD, the integral term calculation value XI, and the amount of operation Dout according to the first embodiment of the present invention.

Here, an explanation will be made to a case where the target phase angle VTt is changed to a predetermined value at time point t1.

In FIG. 9, when the target phase angle VTt first changes to the predetermined value at time point t1, the amount of operation Dout is corrected in an increasing direction by the proportional term calculation value XP corresponding to the phase angle deviation EP, whereby the actual phase angle VTa starts to change in a direction toward the target phase angle VTt.

Subsequently, as the actual phase angle VTa changes, the amount of operation Dout is corrected in a decreasing direction by the differential term calculation value XD corresponding to the actual phase angle change rate DVTa, and at the same time, the amount of operation Dout is corrected in the increasing direction by the integral term calculation value XI obtained by integrating the subtraction value Sub, whereby the actual phase angle VTa is changed so as to converge into the target phase angle VTt.

Accordingly, it is possible to make the actual phase angle VTa converge into the target phase angle VTt while suppressing the amount of overshoot of the actual phase angle VTa.

In addition, when the actual phase angle VTa is converged into the target phase angle VTt, the spool 32 is controlled to hold its zero flow rate position.

Hereinafter, reference will be made to a control delay time due to the control apparatus for an internal combustion engine while referring to a timing chart in FIG. 10.

Figure 10:
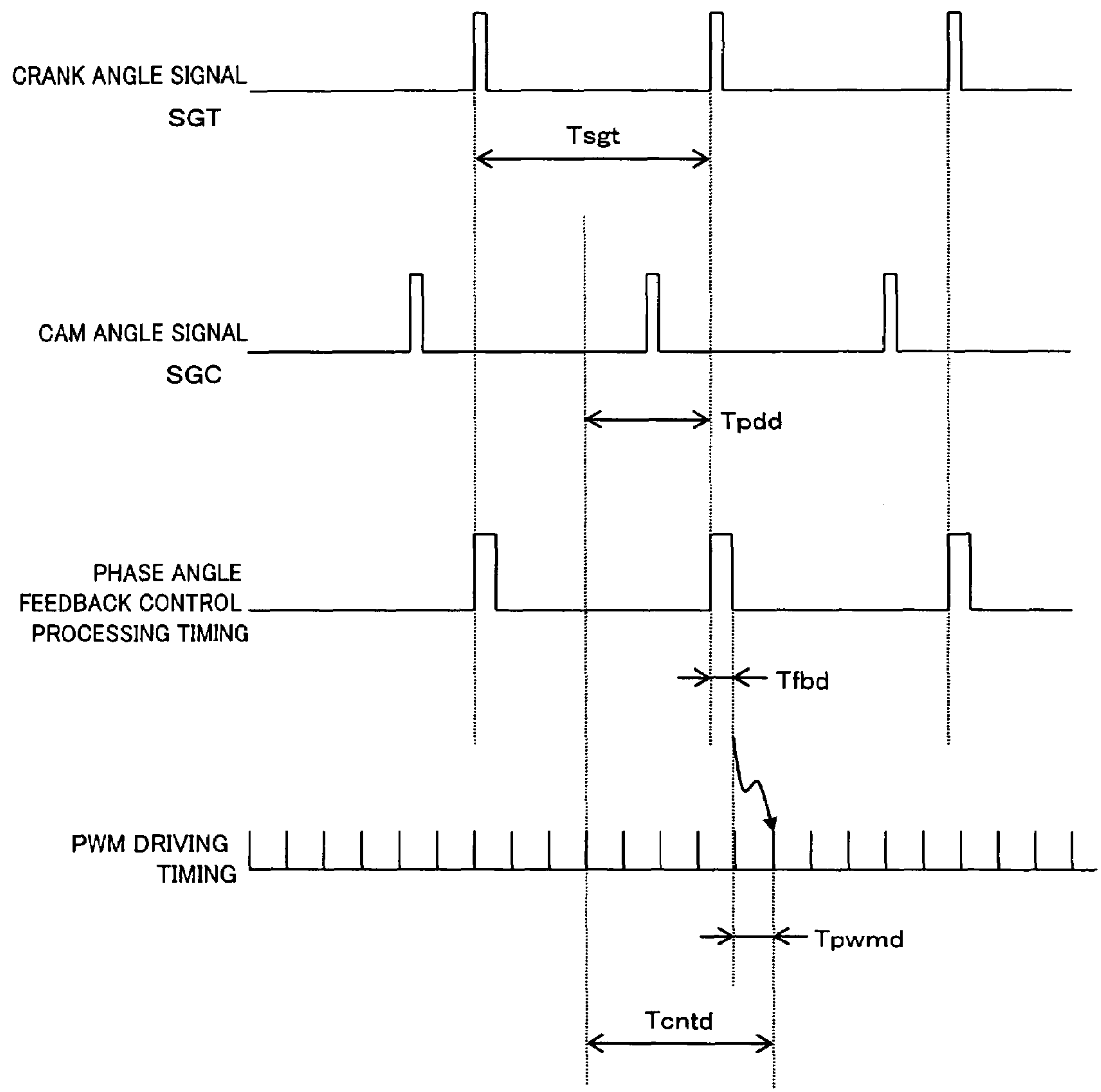
FIG. 10 is a timing chart showing a control delay time in case where an operation amount feedback control section executes phase angle feedback control in synchronization with the crank angle signal in the control apparatus for an internal combustion engine according to the first embodiment of the present invention.

FIG. 10 is the timing chart that shows a control delay time in case where the phase angle feedback control section 67 executes phase angle feedback control in synchronization with the crank angle signal SGT in the control apparatus for an internal combustion engine according to the first embodiment of the present invention.

In FIG. 10, a control delay time Tcntd is the sum total of an actual phase angle detection delay time Tpdd occurring upon detection of the actual phase angle VTa, a phase angle feedback control processing delay time Tfbd occurring upon execution of the phase angle feedback control, and a PWM driving delay time Tpwmd occurring upon driving the OCV 3 in a PWM manner.

In this regard, note that the actual phase angle detection delay time Tpdd is set, as a general delay time, to ½ of the period Tsgt of the crank angle signal for example.

Here, the phase angle feedback control section 67 executes the phase angle feedback control in synchronization with the crank angle signal SGT, so the phase angle feedback control processing delay time Tfbd does not contain a delay due to a deviation between the detection timing of the actual phase angle VTa and the execution timing of the phase angle feedback control (i.e., a delay corresponding to one fixed period Tfb of the phase angle feedback control according to the above-mentioned known control apparatus).

Accordingly, a gain margin until the actual phase angle VTa causes hunting can be increased.

According to the control apparatus for an internal combustion engine of the present invention, the phase angle feedback control section 67 calculates the amount of operation Dout with respect to the linear solenoid 33 of the OCV 3 in synchronization with the crank angle signal SGT.

Thus, the deviation between the detection timing of the actual phase angle VTa and the execution timing of the phase angle feedback control is eliminated to shorten the control delay time Tcntd, so the gain of the phase angle feedback control can be set to a large value, thereby making it possible to shorten the response time of the actual phase angle VTa while maintaining control stability.

In addition, the amount of operation Dout for the linear solenoid 33 is always calculated based on the latest actual phase angle VTa, so it is possible to control the actual phase angle VTa with high accuracy.

Also, the phase angle feedback control section 67 executes the phase angle feedback control according to the PID control, and the integral term calculation value XI and the differential term calculation value XD in the PID control are corrected by the first normalization coefficient Ci and the second normalization coefficient Cd, respectively, which are set based on the crank angle signal period Tsgt and the predetermined reference period Tbase (i.e., 15 msec).

Accordingly, the proportional gain Kp, the differential gain Kd and the integral gain Ki (hereinafter generally referred to as "PID control gains"), being adapted to a predetermined operating state of the internal combustion engine 1, can be applied to in the entire operating range, so it is possible to shorten the response time of the actual phase angle VTa while maintaining good control stability and suppressing an amount of overshoot and an amount of undershoot of the actual phase angle VTa.

Further, the adaptation of the PID control gains becomes easy, thus making it possible to simplify the control logic, and the number of pieces of data for the PID control gains decreases, thereby making it possible to perform data management in an easy manner.

Furthermore, the first normalization coefficient Ci is calculated by dividing the crank angle signal period Tsgt by the predetermined reference period Tbase, so the integral correction of the amount of operation Dout with respect to the linear solenoid 33 can be executed in an appropriate manner in the entire operating range of the internal combustion engine 1. As a result, it is possible to shorten the response time of the actual phase angle VTa while maintaining good control stability and suppressing an amount of overshoot and an amount of undershoot of the actual phase angle VTa.

Additionally, the adaptation of the PID control gains becomes easy, thus making it possible to simplify the control logic, and the number of pieces of data for the PID control gains decreases, thereby making it possible to perform data management in an easy manner.

In addition, the second normalization coefficient Cd is calculated by dividing the predetermined reference period Tbase by the crank angle signal period Tsgt.

As a result, the differential correction of the amount of operation Dout with respect to the linear solenoid 33 can be executed in an appropriate manner in the entire operating range of the internal combustion engine 1, so it is possible to shorten the response time of the actual phase angle VTa while maintaining good control stability and suppressing an amount of overshoot and an amount of undershoot of the actual phase angle VTa.

Also, the adaptation of the PID control gains becomes easy, thus making it possible to simplify the control logic, and the number of pieces of data for the PID control gains decreases, thereby making it possible to perform data management in an easy manner.

Moreover, the differential term calculation value XD used for the differential correction of the amount of operation Dout with respect to the linear solenoid 33 is calculated based on the actual phase angle change rate DVTa that is the change rate of the actual phase angle VTa.

Thus, even when the target phase angle VTt is changed to generate a phase angle deviation EP (=VTt−VTa), the differential term calculation value XD does not change, so there is no need to consider the influence of a derivative control action upon a change in the target phase angle VTt, and the adaptation of the differential gain Kd can be carried out in an easy manner.

Accordingly, by driving the OCV 3 by using the amount of operation Dout corresponding to the actual phase angle change rate DVTa, it is possible to make the actual phase angle VTa converge into the target phase angle VTt in a smooth manner while suppressing the amount of overshoot and the amount of undershoot of the actual phase angle VTa.

In addition, the integral term calculation value XI used for the integral correction of the amount of operation Dout with respect to the linear solenoid 33 is calculated based on the subtraction value Sub(=XP−XD) which is obtained by subtracting the differential term calculation value XD from the proportional term calculation value XP.

As a result, the integral term calculation value XI corresponding to the operation of the actual phase angle VTa following the change in the target phase angle VTt is automatically calculated, so that the amount of operation Dout is set to a value at which the spool 32 is controlled to hold its zero flow rate position when the actual phase angle VTa is converged into the target phase angle VTt.

Accordingly, even when there is an individual difference in the output characteristic of the OCV 3 or there is a change in an operating environment such as the temperature of the hydraulic operating oil, etc., it is possible to calculate in real time the amount of operation Dout with which the spool 32 holds its zero flow rate position, while suppressing the amount of overshoot and the amount of undershoot of the actual phase angle VTa.

Accordingly, it is possible to maintain control stability in case where the phase angle feedback control is in a steady state, without learning the above-mentioned holding current (see the aforementioned first patent document), and it is also possible to ensure the robustness of the phase angle control.

In addition, there is no need to perform current feedback control based on the holding current (see the aforementioned first patent document), so it becomes possible to eliminate a current feedback control circuit and its associated control logic, thus making it possible to simplify the overall control logic and to reduce the production cost.

Further, the phase angle feedback control section 67 calculates the amount of operation Dout with respect to the linear solenoid 33 by correcting the control correction amount Dpid by the use of a battery voltage correction factor KVB (=predetermined reference voltage/battery voltage VB).

Thus, even when the battery voltage is changed due to a load variation of the internal combustion engine 1, etc., it is possible to maintain control stability.

Embodiment 2

In the above-mentioned first embodiment, the phase angle feedback control section 67 calculates the amount of operation Dout with respect to the linear solenoid 33 of the OCV 3 by using the PID control gains (the proportional gain Kp, the differential gain Kd and the integral gain Ki) which are fixed values, respectively, but the present invention is not limited to this.

The phase angle feedback control section 67 may execute the phase angle feedback control by switching among the PID control gains in accordance with the phase angle deviation EP (operating characteristic deviation) between the target phase angle VTt and the actual phase angle VTa.

Also, the phase angle feedback control section 67 may execute the determination of stopping the phase angle feedback control based on the phase angle deviation EP.

In the following, reference will be made to the processing of switching among the PID control gains for the phase angle feedback control in accordance with the phase angle deviation EP and executing the determination of stopping the phase angle feedback control based on the phase angle deviation EP.

The configuration or construction of a control apparatus for an internal combustion engine according to a second embodiment of the present invention is the same as that of the above-mentioned first embodiment, and hence a detailed explanation thereof is omitted.

Now, reference will be made to the operation of the phase angle feedback control section 67 according to the second embodiment of the present invention while referring to a flow chart in FIG. 11.

Note that an explanation is omitted here about the operation of this second embodiment similar to that of the first embodiment.

First of all, it is determined whether the absolute value of the phase angle deviation EP(n) calculated by using the above-mentioned expression (3) is larger than a first predetermined value EP1 (e.g., 1 degrees CA) (step S301).

Figure 11:
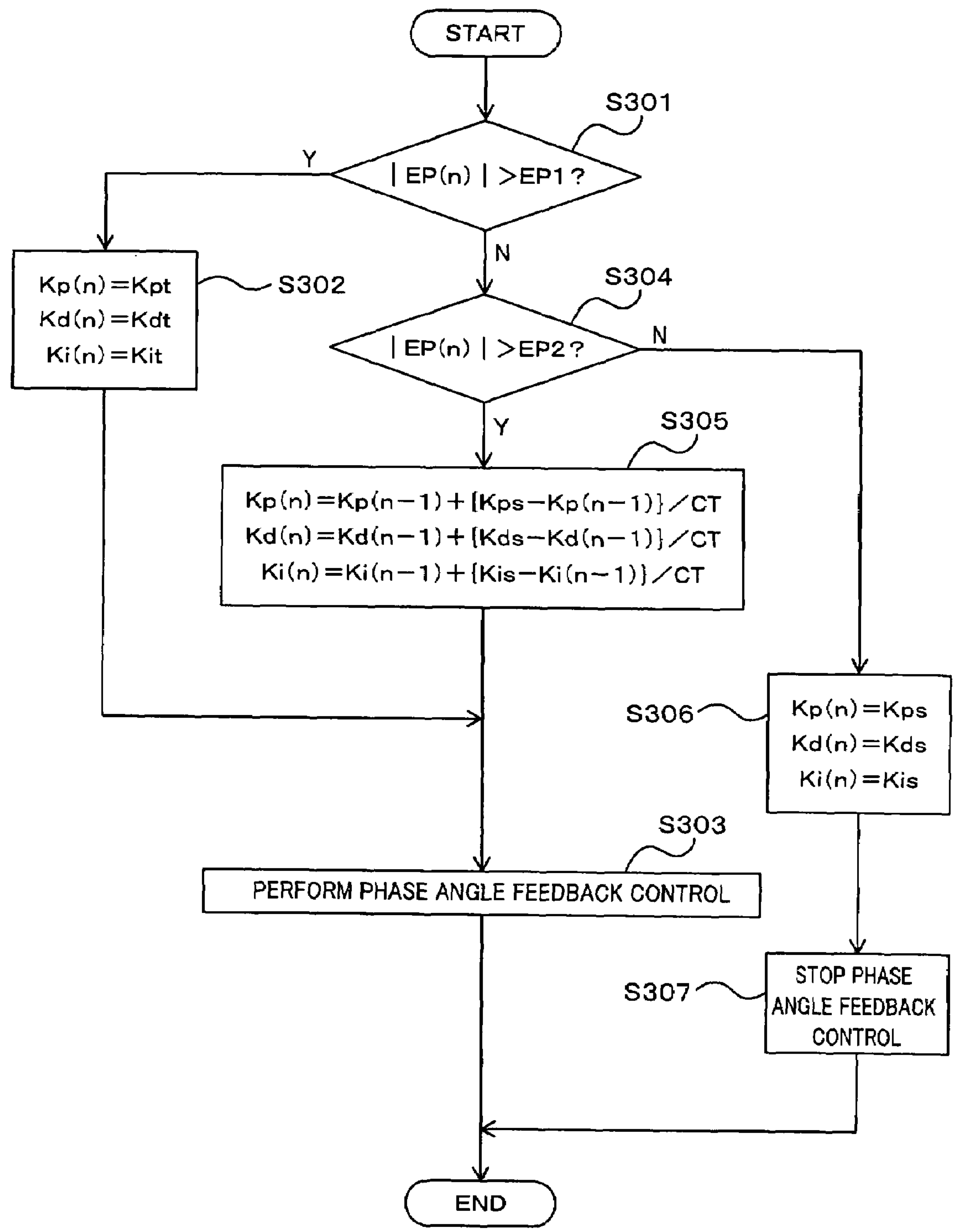
FIG. 11 is a flow chart illustrating the operation of a phase angle feedback control section in a control apparatus for an internal combustion engine according to a second embodiment of the present invention.
Figure 12:
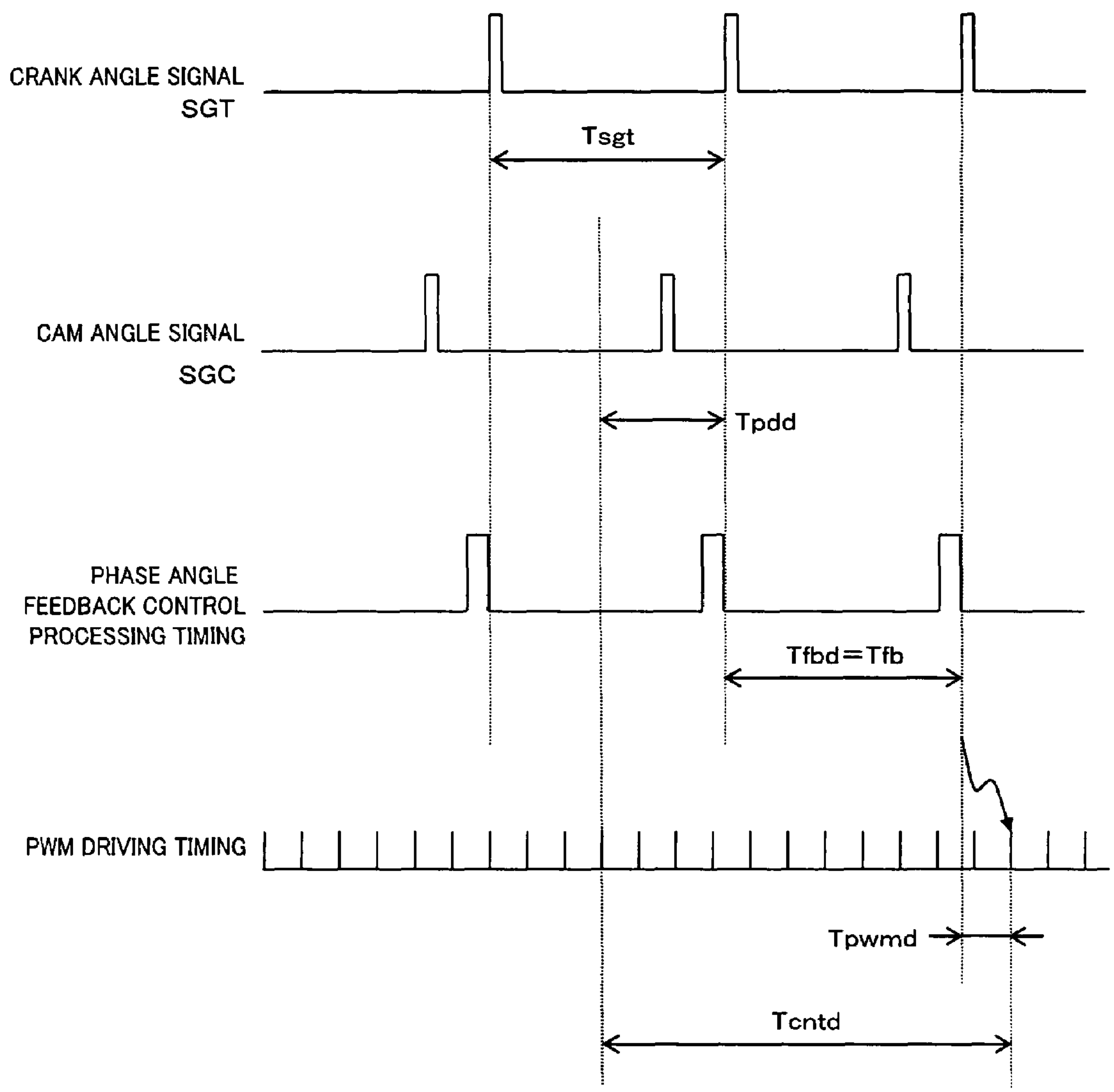
FIG. 12 is a timing chart showing a control delay time occurring when an operation amount feedback control section executes phase angle feedback control at a fixed period in a known valve timing control apparatus.

When it is determined in step S301 that the absolute value of the phase angle deviation EP(n) is larger than the first predetermined value EP1 (that is, Yes), PID control gains (Kp(n), Kd(n), Ki(n)) are set to PID control gains (Kpt, Kdt, Kit), respectively, of the case where the phase angle feedback control is in a transient state (step S302), and the above-mentioned phase angle feedback control (i.e., the operation of the phase angle feedback control section 67 calculating the amount of operation Dout) is executed (step S303), after which the processing of FIG. 11 is terminated.

On the other hand, when it is determined in step S301 that the absolute value of the phase angle deviation EP(n) is equal to or less than the first predetermined value EP1 (that is, No), it is determined whether the absolute value of the phase angle deviation EP(n) is larger than a second predetermined value EP2 (e.g., 0.25 degrees CA) (step S304).

When it is determined in step S304 that the absolute value of the phase angle deviation EP(n) is larger than the second predetermined value EP2 (that is, Yes), the PID control gains (Kp(n), Kd(n), Ki(n)) are gradually switched to the PID control gains (Kps, Kds, Kis), respectively, of the case where the phase angle feedback control is in the steady state (step S305), and the control process shifts to step S303.

That is, the proportional gain Kp(n), the differential gain Kd(n) and the integral gain Ki(n) are set as shown in the following expression (13).

Here, note that in the following expression (13), CT represents an arbitrary predetermined switching frequency (e.g., CT=8) until the PID control gains (Kp(n), Kd(n), Ki(n)) are changed into the PID control gains (Kps, Kds, Kis), respectively, in the steady state of the phase angle feedback control.

$$Kp(n)=Kp(n-1)+\{Kps-Kp(n-1)\}/CT$$

$$Kd(n)=Kd(n-1)+\{Kds-Kd(n-1)\}/CT$$

$$Ki(n)=Ki(n-1)+\{Kis-Ki(n-1)\}/CT \quad (13)$$

Thus, a sudden change in the amount of operation Dout upon switching among the PID control gains is prevented, and it is possible to make the actual phase angle VTa converge into the target phase angle VTt while suppressing the amount of overshoot and the amount of undershoot of the actual phase angle VTa.

On the other hand, when it is determined in step S304 that the absolute value of the phase angle deviation EP(n) is equal to or less than the second predetermined value EP2 (that is, No), a determination is made that the actual phase angle VTa has been converged into the target phase angle VTt, and the PID control gains (Kp(n), Kd(n), Ki(n)) are set to the PID control gains (Kps, Kds, Kis), respectively, of the case where the phase angle feedback control is in the steady state (step S306).

Subsequently, the phase angle feedback control is stopped (step S307), and the amount of operation Dout when the last phase angle feedback control was executed is output, after which the processing of FIG. 11 is terminated.

According to the control apparatus for an internal combustion engine of the second embodiment of the present invention, the phase angle feedback control section 67 executes the phase angle feedback control by making a comparison between the phase angle deviation EP and the first predetermined value EP1, and switching among the PID control gains in accordance with the comparison result.

Thus, for example, in the transient state of the phase angle feedback control in which the target phase angle VTt greatly changes to increase the phase angle deviation EP, it is possible to improve the control response of the actual phase angle VTa by setting the PID control gain to a large value.

In addition, in the steady state of the phase angle feedback control in which the phase angle deviation EP becomes small, control stability can be maintained by setting the PID control gain to a small value.

In addition, when the phase angle deviation EP is equal to or less than the second predetermined value EP2, the phase angle feedback control section 67 determines that the actual phase angle VTa has converged into the target phase angle VTt, so it stops the phase angle feedback control and outputs the amount of operation Dout upon execution of the last phase angle feedback control.

As a result, it is possible to prevent unnecessary change or variation in the amount of operation Dout due to an integral control operation with a minute phase angle deviation EP.

Embodiment 3

Although no mention has been made in the above-mentioned first and second embodiments, the phase angle feedback control section 67 may execute a filter calculation with respect to the actual phase angle VTa detected by the actual phase angle detection section 65 with the use of a filter constant that is variably set in accordance with the crank angle signal period Tsgt.

In the following, reference will be made to the processing of executing the filter calculation with respect to the actual phase angle VTa with the filter constant that is variably set in accordance with the crank angle signal period Tsgt.

The configuration or construction of a control apparatus for an internal combustion engine according to a third embodiment of the present invention is the same as that of the above-mentioned first embodiment, and hence a detailed explanation thereof is omitted.

Note that an explanation is omitted here about the operation of this third embodiment similar to that of the first embodiment.

The phase angle feedback control section 67 executes the filter calculation with respect to the actual phase angle VTa detected by the actual phase angle detection section 65 according to a primary filter expression represented by the following expression (14).

Here, note that in expression (14), "a" represents a filter constant, and VTa(n) represents an actual phase angle detected in an arbitrary stroke n. Also, VTaf(n) and VTaf(n−1) represent actual phase angles obtained by the filter calculation in stroke n and stroke n−1, respectively.

$$VTaf(n)=(1-a)\times VTa(n)+a\times VTaf(n-1) \tag{14}$$

In expression (14) above, in case where the crank angle signal period Tsgt is long (i.e., the number of revolutions per minute NE of the internal combustion engine 1 is low), the filter constant "a" is set to zero, for example.

With this, a detection delay of the actual phase angle VTaf due to the filter calculation is suppressed.

In addition, in case where the crank angle signal period Tsgt is short (i.e., the number of revolutions is high), the filter constant "a" is set to 0.5 for example.

With this, there can be suppressed the influence due to the variation of the detected value of the actual phase angle VTa, which occurs when the processing load of the internal combustion engine 1 for various kinds of control (e.g., the amount of intake air, the amount of fuel to be rejected, ignition timing, etc.) increases to increase the frequency of occurrences of multiple interrupts to the microcomputer 63.

According to the control apparatus for an internal combustion engine of the third embodiment of the present invention, the phase angle feedback control section 67 executes the filter calculation with respect to the actual phase angle VTa with the use of the filter constant "a" that is variably set in accordance with the crank angle signal period Tsgt.

In addition, in case where the crank angle signal period Tsgt is long (i.e., the interrupt processing load to the microcomputer 63 and the variation of the detected value of the actual phase angle VTa are small), the filter constant "a" is set to a small value so that the detection delay of the actual phase angle VTaf is thereby suppressed.

On the other hand, in case where the crank angle signal period Tsgt is short (i.e., the interrupt processing load to the microcomputer 63 and the variation of the detected value of the actual phase angle VTa are large), the filter constant "a" is set to a large value so that the influence due to the variation of the detected value of the actual phase angle VTa is suppressed.

As a result, the control response of the actual phase angle VTa can be improved while maintaining control stability.

Here, note that in the above-mentioned first through third embodiments, reference has been made to the case where the operating characteristic is the actual phase angle VTa of the camshaft 15, but the present invention is not limited to this.

The operating characteristic may be the actual amount of intake air sucked into the internal combustion engine 1.

At this time, the air flow sensor 71, which serves as an actual operating characteristic detection section, detects the actual amount of intake air sucked into the internal combustion engine 1.

Also, a target operating characteristic calculation section (not shown) calculates a target amount of intake air for idle speed control or torque control based on engine operating states such as, for example, the number of revolutions per minute NE of the internal combustion engine 1, the degree of accelerator opening input from an accelerator opening sensor (not shown), etc.

Subsequently, an operation amount feedback control section (not shown) calculates the amount of operation Dout with respect to the throttle actuator 24 in synchronization with the crank angle signal SGT so as to make the actual amount of intake air and the target amount of intake air coincide with each other.

The throttle actuator 24 changes the opening area of the intake passage 22 by controlling the throttle opening of the throttle valve 23.

In this case, too, the operation amount feedback control section serves to shorten the control delay time by calculating the amount of operation Dout with respect to the throttle actuator 24 in synchronization with the crank angle signal SGT, so the response time of the actual engine operating characteristic can be shortened.

Moreover, although in the above-mentioned first through third embodiments, reference has been made to the case where the actuator is the OCV 3, the present invention is not limited to this.

The actuator may be a motor for example.

In this case, too, the operational or advantageous effects similar to those of the above-mentioned first through third embodiments can be achieved.

Also, the phase angle feedback control section 67 according to the above-mentioned first through third embodiments calculates the amount of operation Dout according to the phase angle feedback control due to the PID control, but the amount of operation Dout may be calculated by other control methods than the PID control.

In this case, too, the operational or advantageous effects similar to those of the above-mentioned first through third embodiments can be achieved.

Further, in consideration of the fact that the actual phase angle detection delay time Tpdd occurring upon detection of the actual phase angle VTa becomes small when the crank angle signal period Tsgt is short, the phase angle feedback control may be set to a fixed value in an operating state in which the crank angle signal period Tsgt is short, whereby the processing load of the microcomputer 63 can be reduced.

Furthermore, in order to correct the characteristic change of the actual phase angle change rate DVTa due to the viscosity of the hydraulic operating oil that changes in accordance with the oil temperature, the amount of operation Dout may be corrected by measuring the temperature of the hydraulic operating oil supplied from the OCV 3 and calculating an amount of correction based on the oil temperature thus measured.

In addition, in order to correct a change in the delivery pressure of the pump 42 due to the number of revolutions per minute NE of the internal combustion engine 1, the amount of operation Dout may be corrected by calculating an amount of correction based on the number of revolutions per minute NE.

While the invention has been described in terms of preferred embodiments, those skilled in the art will recognize that the invention can be practiced with modifications within the spirit and scope of the appended claims.

What is claimed is:

1. A control apparatus for an internal combustion engine which is capable of changing an operating characteristic of the internal combustion engine by means of an actuator, the apparatus comprising:

a crank angle sensor that detects a crank angle of a crankshaft of the internal combustion engine and generates a crank angle signal;

an actual operating characteristic detection section that detects an actual value of the operating characteristic as an actual engine operating characteristic;

an operating condition detection section that detects an operating state of the internal combustion engine;

a target operating characteristic calculation section that calculates a target value of the operating characteristic as a target operating characteristic based on the engine operating state; and an operation amount feedback control section that calculates an amount of operation with respect to the actuator according to feedback control so as to make the actual operating characteristic and the target operating characteristic coincide with each other;

wherein the operation amount feedback control section calculates the amount of operation in synchronization with the crank angle signal.

2. The control apparatus for an internal combustion engine as set forth in claim 1, wherein the operation amount feedback control section executes feedback control due to PID control; and an integral term calculation value and a differential term calculation value in the PID control are corrected by a first normalization coefficient and a second normalization coefficient, respectively, which are set based on a period of the crank angle signal and a predetermined reference period.

3. The control apparatus for an internal combustion engine as set forth in claim 2, wherein the first normalization coefficient is calculated by dividing the period of the crank angle signal by the predetermined reference period.

4. The control apparatus for an internal combustion engine as set forth in claim 2, wherein the second normalization coefficient is calculated by dividing the predetermined reference period by the period of the crank angle signal.

5. The control apparatus for an internal combustion engine as set forth in claim 2, wherein the differential term calculation value is calculated based on a change rate of the actual operating characteristic.

6. The control apparatus for an internal combustion engine as set forth in claim 2, wherein the integral term calculation value is calculated based on a subtraction value which is obtained by subtracting the differential term calculation value from a proportional term calculation value in the PID control.

7. The control apparatus for an internal combustion engine as set forth in claim 2, wherein the operation amount feedback control section outputs, as the amount of operation, a value which is obtained by correcting a control correction amount calculated by the PID control by using a battery voltage of a battery of the internal combustion engine.

8. The control apparatus for an internal combustion engine as set forth in claim 2, wherein the operation amount feedback control section calculates a deviation between the target operating characteristic and the actual operating characteristic as an operating characteristic deviation, compares the operating characteristic deviation with a first predetermined value, and variably sets a gain for the PID control in accordance with the result of the comparison.

9. The control apparatus for an internal combustion engine as set forth in claim 1, wherein the operation amount feedback control section calculates a deviation between the target operating characteristic and the actual operating characteristic as an operating characteristic deviation, and stops the feedback control when the operating characteristic deviation is equal to or less than a second predetermined value.

10. The control apparatus for an internal combustion engine as set forth in claim 1, wherein the operation amount feedback control section executes a filter calculation with respect to the actual operating characteristic by the use of a filter constant which is variably set in accordance with the period of the crank angle signal.

11. The control apparatus for an internal combustion engine as set forth in claim 1, further comprising:

an intake valve and an exhaust valve that open and close an intake passage and an exhaust passage, respectively, which lead to a combustion chamber of the internal combustion engine;

a valve timing control mechanism that changes the opening and closing timing of at least one of the intake valve and the exhaust valve by changing a phase angle of a camshaft with respect to the crankshaft; and a cam angle sensor that detects a cam angle of the camshaft and outputs a cam angle signal;

wherein the operating characteristic is the phase angle of the camshaft with respect to the crankshaft;

the actual operating characteristic detection section detects an actual phase angle of the camshaft based on the crank angle signal and the cam angle signal;

the target operating characteristic calculation section calculates a target phase angle based on the operating state; and the actuator drives the valve timing control mechanism.

12. The control apparatus for an internal combustion engine as set forth in claim 11, wherein the actuator is an oil control valve that drives the valve timing control mechanism by adjusting hydraulic operating oil supplied to the valve timing control mechanism.

13. The control apparatus for an internal combustion engine as set forth in claim 1, further comprising:

a throttle valve that is arranged in an intake passage of the internal combustion engine;

wherein the operating characteristic is an amount of intake air sucked into the internal combustion engine;

the actual operating characteristic detection section detects the actual amount of intake air sucked into the internal combustion engine;

the target operating characteristic calculation section calculates a target amount of intake air based on the operating state; and the actuator changes an opening area of the intake passage by controlling a throttle opening of the throttle valve.

* * * * *